United States Patent [19]

Chiotis et al.

[11] Patent Number: 5,143,761
[45] Date of Patent: * Sep. 1, 1992

[54] THERMOPLASTIC FLUOROPOLYMER ADHESIVE COMPOSITION

[75] Inventors: Achilles Chiotis, Menlo Park; Pravin Soni, Union City, both of Calif.

[73] Assignee: Raychem Corporation, Menlo Park, Calif.

[ * ] Notice: The portion of the term of this patent subsequent to May 23, 2006 has been disclaimed.

[21] Appl. No.: 687,191

[22] Filed: Apr. 17, 1991

Related U.S. Application Data

[63] Continuation of Ser. No. 288,371, Dec. 21, 1988, abandoned.

[51] Int. Cl.$^5$ .................. C08L 27/16; H01R 4/72
[52] U.S. Cl. ................... 428/35.1; 428/34.9; 174/84 R; 174/DIG. 8; 525/199
[58] Field of Search ........... 525/199; 428/34.9, 35.1, 428/36.91; 174/84 R, DIG. 8

[56] References Cited

U.S. PATENT DOCUMENTS

| | | | |
|---|---|---|---|
| 3,243,211 | 3/1966 | Wetmore | 403/28 |
| 3,525,799 | 8/1970 | Ellis | 174/84 R |
| 4,197,380 | 4/1980 | Chao et al. | 525/199 |
| 4,282,396 | 8/1981 | Watine et al. | 174/84 R |
| 4,283,596 | 8/1981 | Vidakovits et al. | 174/84 R |
| 4,387,168 | 6/1983 | Morita | 525/199 |
| 4,504,699 | 3/1985 | Dones et al. | 174/84 R |
| 4,696,841 | 9/1987 | Vidakovits | 174/84 R |
| 4,722,471 | 2/1988 | Gray et al. | 228/265 |
| 4,832,248 | 5/1989 | Soni | 228/56.3 |
| 5,008,340 | 4/1991 | Guerra | 525/199 |

FOREIGN PATENT DOCUMENTS

| | | |
|---|---|---|
| 79702 | 5/1983 | European Pat. Off. |
| 0141675 | 5/1985 | European Pat. Off. |
| 0270283 | 6/1988 | European Pat. Off. |
| 2907941A | 9/1979 | Fed. Rep. of Germany |
| 3138300A1 | 6/1982 | Fed. Rep. of Germany |
| 2425744 | 12/1979 | France |
| WO87/06597 | 11/1987 | PCT Int'l Appl. |
| 1470049 | 4/1977 | United Kingdom |
| 2025157 | 1/1980 | United Kingdom |

OTHER PUBLICATIONS

International Search Report for PCT/US89/05763.
International Search Report for PCT/US89/05761.

Primary Examiner—James J. Seidleck
Assistant Examiner—David Buttner
Attorney, Agent, or Firm—Marguerite E. Gerstner; Herbert G. Burkard

[57] ABSTRACT

A thermoplastic fluoropolymer adhesive composition containing a thermoplastic fluoropolymer, an elastomeric fluoropolymer, a thermoplastic ethylene copolymer and a tackifier, in which the combined amount of ethylene copolymer and tackifier is less than about 30% by weight (based on the weight of the four components) and the ratio of ethylene copolymer is less than about 2:1, has improved sealing performance and flame resistance than similar compositions containing greater amounts of ethylene copolymer and tackifier. The composition is particularly useful for sealing surfaces of uncrosslinked ethylene-tetrafluoroethylene copolymers.

14 Claims, 1 Drawing Sheet

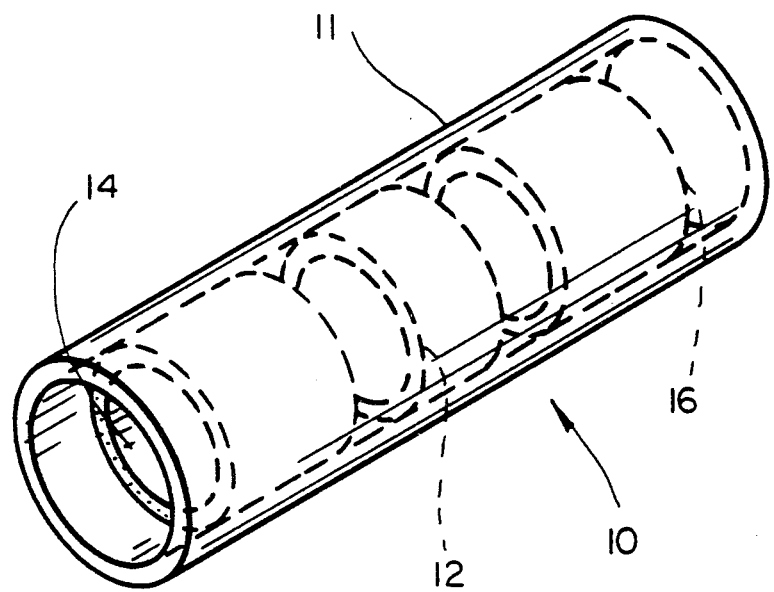
FIG_1
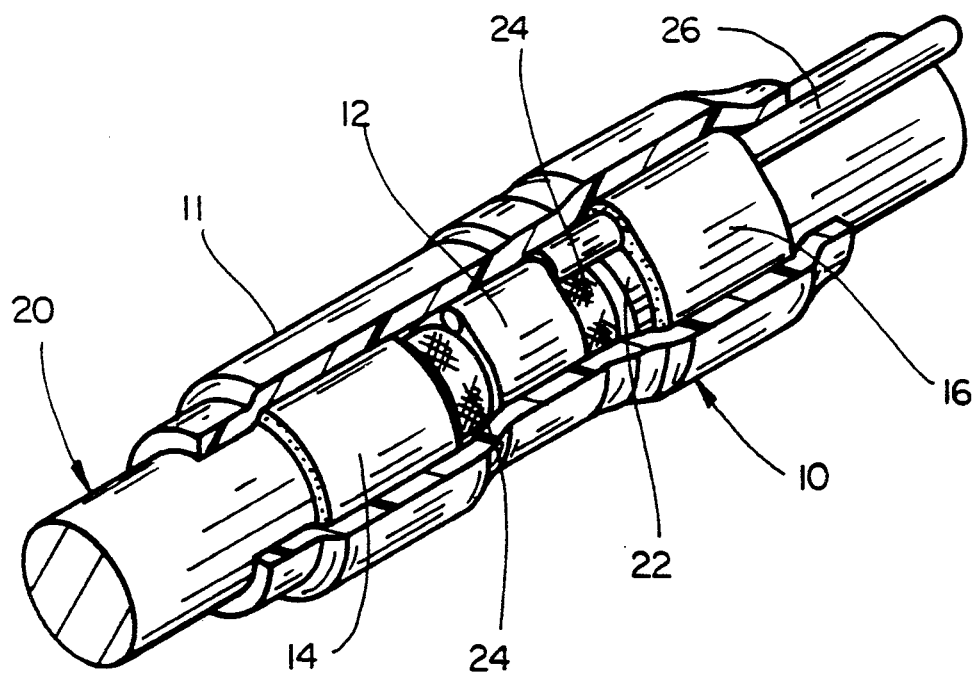
FIG_2

THERMOPLASTIC FLUOROPOLYMER ADHESIVE COMPOSITION

CROSS-REFERENCE TO RELATED APPLICATIONS

This application is a continuation of copending, commonly assigned application Ser. No. 07/288,371, now abandoned filed Dec. 21, 1988, the disclosure of which is incorporated herein by reference.

BACKGROUND OF THE INVENTION

Field of the Invention

This invention relates to a thermoplastic fluoropolymer adhesive, a heat recoverable article coated on at least a portion of a surface thereof with said adhesive, and to a method of bonding to a substrate using said adhesive.

Introduction to the Invention

The adhesive bonds to a wide variety of surfaces, including polymeric surfaces having a low surface energy, e.g. a surface energy of less than about 27 dynes/cm, as determined by a measurement of critical surface tension. Such surfaces include, for example, fluoropolymers such as an ethylene-tetrafluoroethylene copolymer or polytetrafluoroethylene. It is well known that it is extremely difficult to bond to such surfaces. In U.S. Pat. No. 4,197,380 to Chao et al a hot melt adhesive capable of bonding to such surfaces is disclosed. The adhesive comprises an ethylene copolymer, a fluoroelastomer and a tackifier in specified proportions. The fluoropolymer content is no more than 60%, preferably less than 50%, by weight, based on the weight of the three components. While this adhesive performs satisfactorily in many applications it has been found that under certain demanding conditions greater bond strength, sealing performance and/or improved flame resistance is desired.

SUMMARY OF THE INVENTION

This invention provides an adhesive composition comprising:
(a) about 40 to about 70% by weight of a thermoplastic fluoropolymer;
(b) about 5 to about 25% by weight of an elastomeric fluoropolymer;
(c) about 5 to about 25% by weight of a thermoplastic ethylene copolymer comprising at least 50 mole % of units derived from ethylene and at least 5 mole % of units derived from at least one unsaturated comonomer containing at least one polar group; and
(d) about 5 to about 20% by weight of a tackifier;
with the proviso that the combined amounts of (c) and (d) are less than about 30% by weight so that the ratio of (c) to (d) is less than about 2:1, all percentages by weight being based on the total weight of the four components.

The composition is particularly useful for bonding to a variety of surfaces, including fluoropolymer surfaces such as ethylene-tetrafluoroethylene copolymers and polytetrafluoroethylene.

Another aspect of this invention comprises a heat recoverable article having a coating on at least a portion of a surface thereof, an adhesive composition comprising:

(a) about 40 to about 70% by weight of a thermoplastic fluoropolymer;
(b) about 5 to about 25% by weight of an elastomeric fluoropolymer;
(c) about 5 to about 25% by weight of a thermoplastic ethylene copolymer comprising at least 50 mole % of units derived from ethylene and at least 5 mole % of units derived from at least one unsaturated comonomer containing at least one polar group; and
(d) about 5 to about 20% by weight of a tackifier;
with the proviso that the combined amounts of (c) and (d) are less than about 30% by weight and that the ratio of (c) to (d) is less than about 2:1, all percentages by weight being based on the total weight of the four components.

A further aspect of this invention comprises a method of bonding a surface to another surface, which method comprises:
i) applying to one of the surfaces to be bonded an adhesive composition comprising:
(a) about 40 to about 70% by weight of a thermoplastic fluoropolymer;
(b) about 5 to about 25% by weight of an elastomeric fluoropolymer;
(c) about 5 to about 25% by weight of a thermoplastic ethylene copolymer comprising at least 50 mole % of units derived from ethylene and at least 5 mole % of units derived from at least one unsaturated comonomer containing at least one polar group; and
(d) about 5 to about 20% by weight of a tackifier;
with the proviso that the combined amounts of (c) and (d) are less than about 30% by weight and that the ratio of (c) to (d) is less than about 2:1, all percentages by weight being based on the total weight of the four components;
ii) bringing the surfaces to be bonded together with said adhesive being positioned between them;
iii) applying sufficient heat to cause the adhesive to melt and flow; and
iv) cooling.

BRIEF DESCRIPTION OF THE DRAWING

FIG. 1 illustrates a soldering device in which the adhesive composition of this invention is used.

FIG. 2 illustrates the device of FIG. 1 installed to form a sealed cable shield termination.

DETAILED DESCRIPTION OF THE INVENTION

Each thermoplastic fluoropolymer and the elastomeric fluoropolymer can be a polymer of one or more fluorinated monomers containing ethylenic unsaturation and optionally one or more other compounds containing ethylenic unsaturation. The fluorinated monomer may be a perfluorinated monoolefin, for example hexafluoropropylene or tetrafluoroethylene, or a partially fluorinated monoolefin which may contain other substituents, e.g. chlorine or perfluoroalkoxy, for example vinylidene fluoride, chlorotrifluoroethylene and perfluoroalkyl vinyl ethers in which the alkyl group contains up to six carbon atoms, e.g. perfluoro (methyl vinyl ether); the monoolefin is preferably a straight or branched chain compound having a terminal ethylenic double bond and containing less than six carbon atoms, especially two or three carbon atoms. The polymer preferably consists of units derived from fluorine-containing monomers. When units derived from other monomers are present, the amount thereof is preferably less than 30 mole %, generally less than 15 mole %; such other monomers include, for example olefins containing less than six carbon atoms and having a terminal ethylenic double bond, especially ethylene and propylene. The polymer will preferably consist of carbon, hydrogen, fluorine and oxygen atoms. The fluoropolymer is thermoplastic or elastomeric depending on the mole ratio of the monomer(s) used and the process used in its manufacture.

Preferred thermoplastic fluoropolymers are homo- and copolymers of vinylidene fluoride, such as copolymers thereof with hexafluoropropylene. Preferred thermoplastic fluoropolymers are commercially available from Pennwalt under the trademark Kynar, for example Kynar 7201 and Kynar 9301.

The thermoplastic fluoropolymer is present in the adhesive composition in an amount of about 30 to about 50% by weight. Preferably the thermoplastic fluoropolymer is present in an amount of about 35 to about 50% by weight and most preferably of about 40 to about 45% by weight, all percentages being by weight based on the total weight of the four components (a) through (d).

Preferred elastomers are copolymers of vinylidene fluoride and at least one other fluorinated monomer, especially one or more of hexafluoropropylene, tetrafluoroethylene and chlorotrifluoroethylene, the vinylidene fluoride content preferably being 30 to 70 mole %. Commercially available fluoroelastomers of this class include copolymers of vinylidene fluoride and hexafluoropropylene such as Viton A, Viton A35 and Viton AHV sold by du Pont; copolymers of vinylidene fluoride, hexafluoropropylene and tetrafluoroethylene such as Viton B and Viton B50 sold by du Pont; and copolymers of vinylidene fluoride and chlorotrifluoroethylene such as Kel-F sold by Minnesota Mining and Manufacturing Co. The Mooney viscosity of the elastomer at 100° C. is generally 20 to 200, preferably 30 to 160.

The elastomeric fluoropolymer is present in the adhesive composition in an amount of about 5 to about 40% by weight. Preferably the elastomeric fluoropolymer is present in an amount of about 10 to about 30% by weight and most preferably of about 15 to about 25% by weight, all percentages being by weight based on the weight of the four components (a) through (d).

The ethylene copolymer is preferably a crystalline copolymer containing at least 50 mole %, preferably at least 60 mole %, especially at least 65 mole % of units derived from ethylene, and at least 5 mole %, preferably 10 to 40 mole %, especially 15 to 35 mole %, particularly 15 to 25 mole %, of units which contain at least one polar group which units may be obtained by copolymerizing at least one unsaturated comonomer containing at least one polar group and/or by modification, e.g. by partial or complete hydrolysis, of units derived from at least one such comonomer. The comonomer preferably contains a terminal ethylenic double bond. Preferred polar groups are carboxyl groups and carboxylic ester groups, including both pendant carboxylic ester groups, derived for example from alkyl esters of unsaturated carboxylic acids, and pendant alkyl carbonyloxy groups, derived for example from vinyl esters of saturated carboxylic acids. Other polar groups include cyano groups and hydroxyl groups, which may be obtained for example by hydrolysis of copolymers containing units derived from vinyl esters. Particularly suitable monomers include vinyl esters of saturated carboxylic acids containing 1 to 4 carbon atoms, especially vinyl acetate; acrylic and methacrylic acids; and alkyl (including cycloalkyl) and aryl esters, especially methyl esters, of acrylic and methacrylic acids, said esters preferably containing at most 10 carbon atoms, especially methyl methacrylate, methyl acrylate and ethyl acrylate.

The copolymer may contain units in addition to those derived from ethylene and those containing polar groups, but the amount of such additional units is preferably less than 20 mole %, particularly less than 10 mole %, especially substantially zero.

Particularly preferred as the ethylene copolymer is a copolymer of ethylene and vinyl acetate and 0 to 10 mole % of another comonomer, preferably a polar comonomer. Such copolymers are referred to herein as EVA copolymers. The vinyl acetate content in such copolymers is preferably 20 to 30 mole %. For some purposes an EVA copolymer having a melt index of not more than 10, e.g. 1.5 to 7.5, is preferred.

Suitable commercially available ethylene copolymers include the copolymers of ethylene and ethyl acrylate with a small proportion of methacrylic acid which are sold by Union Carbide as DPD 6169 and DPD 6181 and the 72:28 copolymers of ethylene and vinyl acetate which are sold by du Pont as Elvax 4260 and 260.

The thermoplastic ethylene copolymer is present in the adhesive composition in an amount of about 5 to about 25% by weight. Preferably the ethylene copolymer is present in an amount of about 10 to about 25% by weight and most preferably about 15 to about 20% by weight, all percentages being by weight based on the total weight of the four components (a) through (d).

The term "tackifier" is used in adhesive art to denote a material which when added to an adhesive composition promotes its adhesion to a substrate, by increasing its ability to wet the substrate. Many tackifiers are known. We prefer to use low molecular weight polymers of monomers which contain ethylenic unsaturation and are free of polar groups, for example polymers of one or more compounds of the formula $$R_1CH=CR_2R_3$$

wherein each of $R_1$, $R_2$ and $R_3$, which may be the same or different, is a substituted or unsubstituted alkyl (including cycloalkyl), alkenyl (including cycloalkenyl), aryl, aralkyl or alkaryl radical containing less than ten carbon atoms. Suitable such tackifiers include Nevpene 9500, which is believed to be a copolymer of a mixture of aromatically and alphatically substituted ethylenes, and Piccotex 75, which is believed to be a copolymer of vinyl toluene and α-methylstyrene. Other tackifiers which can be used include terpene-phenolic resins (e.g. Nevillac Hard). The tackifiers used preferably have at least one of the following properties

| | |
|---|---|
| Brookfield Viscosity at 160° C. | 80–1500 centipoises |
| Ball-and-Ring Softening point | 50–130° C. |
| Molecular Weight | <3000 |

The tackifier is present in the adhesive composition in an amount of about 5 to about 20% by weight. Preferably the composition contains about 10 to about 20% by weight of tackifier and most preferably about 10 to about 15% by weight, all percentages being by weight based on the total weight of the four components (a) through (d).

In the adhesive composition of this invention, the combined amount of thermoplastic fluoropolymer and fluoroelastomer preferably should be at least about 70%, more preferably at least about 75% and most preferably about 80%. Conversely, the combined amount of ethylene copolymer and tackifier preferably should be less than about 30%, more preferably less than about 25% and most preferably about 20% (all percentages being by weight based on components (a) through (d)).

The ratio of ethylene copolymer to tackifier is less than about 2:1, preferably less than about 1.5:1 and most preferably is about 1:1. Further, the ratio of ethylene copolymer to tackifier should be greater than about 1:2, preferably greater than 1:1.5.

Surprisingly the adhesive composition of this invention which contains relatively low amounts of ethylene copolymer and tackifier has better sealing performance than similar compositions containing a higher proportion of ethylene copolymer and tackifier. It has also been found that the adhesive composition of this invention also has better flame retardancy than such compositions containing a higher proportion of ethylene copolymer and tackifier.

The adhesive composition of this invention is particularly advantageous for sealing and/or bonding to a surface having a low surface energy, i.e. a surface energy of less than about 27 dynes/cm. Examples of such surfaces are ethylene tetrafluoroethylene copolymer, polytetrafluoroethylene, and the like. The adhesive is generally applied to one of the surfaces to be bonded together and then the surfaces to be bonded are brought together with the adhesive positioned between them. Heat is applied to cause the adhesive to melt and flow to fill any irregularities in the surface and the assembly is then cooled. The adhesive exhibits excellent sealing between the surfaces. The adhesive can, of course, be used with surfaces with higher surface energies and are thus much easier to bond to. Such other surfaces include polymeric and metallic surfaces.

In a preferred embodiment, the adhesive is coated on at least a portion of a surface of a heat recoverable article, such as a heat recoverable tubular article or wraparound sleeve. Typically the article is heat shrinkable and the adhesive is coated on at least a portion of the inner surface thereof or is provided as a preformed adhesive insert.

Heat-recoverable articles are articles the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case maybe, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example in British patent 1,440,524, an elastomeric member such as an outer tubular member is held in a stretched state by a second member, such as an inner tubular member, which, upon heating weakens and thus allows the elastomeric member to recover.

The adhesive composition is particularly useful in heat recoverable articles such as harnesses, transition, boots, sleeves for sealing wire or cable splices or the like.

Heat-recoverable articles with which the adhesive composition of this invention can be used are well known. Certain of said articles can be used for forming solder connections between electrical conductors in view of the ease of forming the connection and the quality of the connection so formed. For such applications the article, usually in the form of a sleeve, contains a quantity of solder for forming the electrical connection and a pair of fusible inserts for sealing the connection. These articles are described for example in U.S. Pat. Nos. 3,243,211, 4,282,396, 4,283,596 and 4,722,471, European patent publication No. 0,270,283, and British Pat. No. 1,470,049 the disclosures of which are incorporated herein by reference, and are sold by Raychem Corporation, Menlo Park Calif. under the trade mark "SOLDER SLEEVE" amongst others. Similar articles are also disclosed in U.S. Pat. Nos. 4,504,699 and 4,282,396, which disclosures are also incorporated herein by reference.

In addition to its excellent sealing performance, the adhesive composition of this invention exhibits exceptional flame resistance. For example, when used to seal the open ends of a recoverable tubular soldering device having a solder insert in a center region thereof and an adhesive insert (preferably a coating of adhesive on the inner surface of the article) positioned between the solder and each open end, the installed, environmentally sealed device passes the flammability test set forth in MIL-S-83519.

The following examples illustrate adhesive compositions of this invention and use of an adhesive in accordance with this invention in a heat recoverable tubular article.

EXAMPLES 1-4

Adhesive formulations having the ingredients and amounts thereof specified in Table I were prepared by mixing the ingredients in a Brabender at 60 rpm for approximately 10 minutes at 110° C.

TABLE I

|                    | 1     | 2     | 3     | 4     |
|--------------------|-------|-------|-------|-------|
| PVDF #1            | —     | —     | 15%   | 15%   |
| PVDF #2            | 47.5% | 67.5% | 42.5% | 42.5% |
| Ethylene Copolymer | 15%   | 10%   | 10%   | 20%   |
| Fluoroelastomer    | 20%   | 10%   | 20%   | 10%   |
| Tackifier          | 15%   | 10%   | 10%   | 10%   |
| Misc. Additives    | 2.5%  | 2.5%  | 2.5%  | 2.5%  |

PVDF #1 = A thermoplastic terpolymer of vinylidene fluoride, tetrafluoroethylene and hexafluoropropylene, commercially available as Kynar 9301 from Pennwalt.
PVDF #2 = A thermoplastic copolymer of vinylidene fluoride and tetrafluoroethylene, commercially available as Kynar 7201 from Pennwalt.
Ethylene Copolymer = a copolymer of ethylene and vinyl acetate containing 28% vinyl acetate, commercially available as Elvax 4260, commercially available from du Pont.
Fluoroelastomer = a copolymer of vinylidene fluoride and hexafluoropropylene (Molar ratio 60:40) commercially available as Viton A 35 from du Pont.
Tackifier = A copolymer of vinyltoluene and α-methyl styrene having a softening point of 75° C., commercially available as Piccotex 75 from Hercules.

EVALUATION

Each of the formulations prepared in Examples 1–4, was used as an adhesive insert as shown in the drawing. In FIG. 1, a heat recoverable soldering device 10, comprises a heat recoverable sleeve 11 and is provided with solder insert 12 and adhesive inserts 14 and 16, each of the same formulation of one of the above examples. In FIG. 2, shielded cable 20 is insulated with uncrosslinked ethylene-tetrafluoroethylene copolymer (commercially available as Tefzel from du Pont). The insulation 22 has been removed to expose a portion of the metallic braid 24, which acts as the cable shield. Ground lead 26 is secured to the braid by solder 12 of the recovered soldering device 10. The adhesive inserts 14 and 16 seal the open ends of the recovered sleeve 11. Twenty-five samples incorporating each of the adhesive formulations of Examples 1–4 were prepared making a total of 100 samples.

The installed devices were tested as follows:

Moisture Resistance Test: The samples were tested using MIL-S-83519 which is a 10 day temperature cycling (−10° to 65° C.) test conducted at 95% humidity.

Insulation Resistance Test: Twenty-five samples of each formulation were tested using MIL-S-83519. Within one hour from the time they were removed from the humidity test, the samples were immersed in a salt and water-wetting agent solution for 30 minutes. While the samples were still immersed, a voltage of 500 volts DC was applied between the ground lead and the water bath. An ohmmeter is used to measure the resistance of the sealing sleeve. If the measured resistance is 1000 megaohm or greater the sample passed the test. All one hundred samples passed. The test was then extended beyond the method of MIL-S-83519 and the samples were immersed for an additional 30 minutes, and a voltage of 1000 volts DC was applied. The resistance was again measured. All one hundred samples passed.

Flame Resistance Test: Five samples prepared using the adhesive formulation of Example 2 were tested for flame retardancy using the Flammability test of MIL-S-83519. All samples passed.

What is claimed is:

1. An adhesive composition comprising:
   (a) about 40 to about 70% by weight of a thermoplastic fluoropolymer which is a thermoplastic copolymer of vinylidene fluoride and at least one other monomer;
   (b) about 5 to about 25% by weight of an elastomeric fluoropolymer;
   (c) about 5 to about 25% by weight of a thermoplastic ethylene copolymer comprising at least 50 mole % of units derived from ethylene and at least 5 mole % of units derived from at least one unsaturated comonomer containing at least one polar group; and
   (d) about 5 to about 20% by weight of a tackifier; with the proviso that the combined amounts of (c) and (d) are less than about 30% by weight and that the ratio of (c) to (d) is less than about 2:1, all percentages by weight being based on the total weight of the four components.

2. An adhesive composition in accordance with claim 1, wherein (a) is a mixture of a thermoplastic terpolymer of vinylidene fluoride, tetrafluoroethylene and hexafluoropropylene and a thermoplastic copolymer of vinylidene fluoride and tetrafluoroethylene.

3. An adhesive composition in accordance with claim 1, wherein (b) is an elastomeric copolymer of vinylidene fluoride and at least one other monomer.

4. An adhesive composition in accordance with claim 3, wherein (b) is an elastomeric copolymer of vinylidene fluoride and hexafluoropropylene.

5. An adhesive composition in accordance with claim 1, wherein (c) is an ethylene vinyl acetate copolymer.

6. An adhesive composition in accordance with claim 1, wherein (d) is a copolymer of vinyltoluene and α-methyl styrene.

7. A heat-recoverable article having a coating on at least a portion of a surface thereof, an adhesive composition comprising:
   (a) about 40 to about 70% by weight of a thermoplastic fluoropolymer which is a thermoplastic copolymer of vinylidene fluoride and at least one other monomer;
   (b) about 5 to about 25% by weight of an elastomeric fluoropolymer;
   (c) about 5 to about 25% by weight of a thermoplastic ethylene copolymer comprising at least 50 mole % of units derived from ethylene and at least 5 mole % of units derived from at least one unsaturated comonomer containing at least one polar group; and
   (d) about 5 to about 20% by weight of a tackifier; with the proviso that the combined amounts of (c) and (d) are less than about 30% by weight and that the ratio of (c) to (d) is less than about 2:1, all percentages by weight being based on the total weight of the four components.

8. A heat-recoverable article in accordance with claim 7, wherein (a) is a mixture of a thermoplastic terpolymer of vinylidene fluoride, tetrafluoroethylene and hexafluoropropylene and a thermoplastic copolymer of vinylidene fluoride and tetrafluoroethylene.

9. A heat-recoverable article in accordance with claim 7, wherein (b) is an elastomeric copolymer of vinylidene fluoride and at least one other monomer.

10. A heat-recoverable article in accordance with claim 9, wherein (b) is an elastomeric copolymer of vinylidene fluoride and hexafluoropropylene.

11. A heat-recoverable article in accordance with claim 7, wherein (c) is an ethylene vinyl acetate copolymer.

12. A heat-recoverable article in accordance with claim 7, wherein (d) is a copolymer of vinyltoluene and α-methyl styrene.

13. A heat-recoverable article in accordance with claim 7, which further comprises solder, said solder being in contact with at least a portion of a surface of the heat-recoverable article.

14. A heat-recoverable article in accordance with claim 13, wherein said article is a heat-shrinkable tubular article which has two open ends, contains a solder insert in a central region thereof and said adhesive is coated on said article between said solder insert and each open end of said article.

* * * * *